UNITED STATES PATENT OFFICE 2,148,634

CATALYSTS

Boris Malishev, Elizabeth, N. J.

No Drawing. Application March 9, 1938,
Serial No. 194,769

7 Claims. (Cl. 23—233)

My invention relates to catalytic agents and methods of their preparation and has particular reference to catalytic agents for refining, synthesising and polymerizing hydrocarbons.

This is a continuation in part of my application No. 140,441, filed May 3, 1937 with reference also to my copending application Serial No. 205,724, filed May 3, 1938.

In my foregoing application I described a method of preparation of a catalyst from sulfuric acid anhydride, or sludge acid, with a phosphate compound such as phosphate rock (phosphorite) and also other mineral phosphates such as apatite, vivianite, wavelite, and monazite and their synthetic equivalents by calcining the mixture at a temperature above 245° C. and preferably above 300° but below the red heat. It may be noted that none of the foregoing minerals represents a compound of a single phosphate, but a phosphate carbonate and silicate of several elements.

I have also obtained a catalyst of equal activity by using other synthetic and natural phosphates instead of the above phosphate compounds, such as bone-ash, phosphatic slag, Thomas slag, (for definition see "Chemical Dictionary" by Ingo W. D. Hackh, 1929, p. 731), superphosphates, etc.

It is known that acid sulfates can be converted by heating into pyrosulfates, which on further heating readily decompose into sulfuric acid anhydride, the latter being the active agent in the process of preparation of my catalyst. All the sulfur containing compounds used in my process such as sulfuric acid anhydride, sulfuric acid, alkali acid sulfates, pyrosulfates and sludge acid, have one general characteristic in that they all give acid reaction due to sulfuric acid in their aqueous solutions. They may be called, therefore, "compounds with an acid sulfuric acid reaction in water". The cause of the catalytic activity, I believe, is due to the information of phosphoric anhydride during calcination with sulfuric anhydride, as follows:

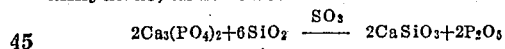

Perhaps part of $P_2O_5$ is converted into a nonvolatile isomeric modification and forms a double anhydride with $SiO_2$ and $SO_3$. As is known, acid sulfates when heated to a temperature as required for calcination in my process, i. e. below red heat, decompose into water, sulfuric acid and pyrosulfates. Such a decomposition takes place at a temperature between 316 and 400° C. for sodium acid sulfate. Pyrosulfates decompose near their melting point into sulfuric anhydride and neutral sulfates. This temperature for sodium pyrosulfates is about 400 to 500° C. These temperatures lie below red heat which by definition is between 585 and 840° C. The decomposition is complete when all acid fumes are expelled.

As I disclosed in the foregoing application, sludge acid can be used for the preparation of my catalyst, the product being but slightly less active than the catalyst prepared with sulfuric acid anhydride. Certain precautions must be taken in the process, however, in order to completely destroy or eliminate tarry organic substances and carbon formed which may interfere with the proper contact of the catalyst with the substance to be treated. For this purpose the process is conducted as follows: at first, an intimate mixture of inorganic phosphate, siliceous material and sludge acid is calcined at the temperature of about 300° C. In the reaction taking place during this calcination the catalyst is produced. At the same time volatile constituents of the organic matter are expelled. In order to remove the residual organic matter which is very firmly bound to the catalyst, the mass is first disintegrated with steam at 300° C. and is then calcined in the atmosphere of air or oxygen at a temperature above 300° C. but below red heat until all the organic matter and carbon are burned out. The resultant mass which is deadburned and not very active, is activated with steam. The steam treatment is also beneficial for producing a mass of good pelleting or briquetting qualities.

Occasionally, when sludge acid is used, the above calcination with oxygen does not remove all of the organic matter and carbon, in which case the catalyst does not acquire its full activity. I have found, however, that the complete oxydation of the organic matter and carbon can be effected by adding suitable oxidizing agents to the mixture during the process of calcination, the resulting product then possessing full catalytic activity. Satisfactory oxidation is obtained with cheap minerals such as Chilean saltpeter of pyrolusite ($MnO_2$), also with other oxidizing agents or catalytic oxygen carriers in presence of oxygen. Thus, for instance, I have obtained good results with oxides and acids of nitrogen, metal oxides and peroxides, peracids and their salts such as perborates, persulfates, etc. As oxygen carriers I used salts of manganese, chromium, cerium, thorium, etc. I have also found that the presence of a mineral acid is required in order to obtain the full effect of the oxidizing agent, and for this purpose sulfuric acid can be used as the cheapest.

*Example I.*—3000 gm. of phosphate rock is mixed with 3000 gm. of diatomaceous earth and to this mixture is added 6000 gm. of acid sludge obtained from treating gasoline, forming a paste. The latter is calcined for 3 hrs. at 300° C., then roasted with air or oxygen to burn out the most of the organic matter and carbon. The product is powdered and mixed with 300 gm. of powdered pyrolusite and 300 gm. of sulfuric acid forming a paste. The mixture is calcined for 20 minutes and then treated with steam for 2 hrs. at 300° C. The product is powdered and briquetted into pellets of about ⅜ in. in diameter.

*Example II.*—Unrefined cracked gasoline is pumped through my catalyst at a temperature between 200 and 300° C. and at a pressure sufficient to maintain the liquid state. Gases containing olefines, such as are obtained in cracking petroleum oil, are admitted to the hot gasoline in a quantity sufficient to form a mixture of gas and liquid. The product obtained is redistilled to the desired end-point, the yield of gasoline being greater than obtained in the process without the cracked gases. The olefines are apparently polymerized and condensed with aromatic compounds.

The application of my catalyst does not necessarily require the foregoing temperatures. I have found that when my catalyst is used at temperatures between about 400° C. and 600° C. and at the atmospheric pressure, although some considerable cracking of hydrocarbons takes place, yet the polymerization and condensation reactions still prevail, however, less stable hydrocarbons being cracked and the fragments thus formed simultaneously polymerized and condensed into a more stable product. For example, I converted normally gaseous hydrocarbons of the methane series and a mixture of these hydrocarbons with olefines into a liquid motor fuel. Such condensation took place also with aromatic hydrocarbons in the mixture.

The process can be also conducted in two steps; at first, cracking the raw material at ordinary pressure, as described above, and then polymerizing and condensing the cracked products at an elevated pressure such as 100 to 1000 lbs. per sq. inch, and at somewhat lower temperature, from 150 to 300° C. In this manner more gaseous products are converted into liquid fuel.

In my experiments, I have been using diatomaceous earth, such as kieselguhr. I have also found that other siliceous adsorbing materials or minerals can be used, such as finely ground quartz.

*Example III.*—3000 gm. of finely powdered phosphate rock containing about 70% of $Ca_3(PO_4)_2$ is mixed with 3000 gm. of powdered diatomaceous earth and to this mixture is added 3000 gm. of 20% fuming sulfuric acid, forming a paste. The latter is calcined until the acid fumes are expelled. The product may be powdered and briquetted into pellets of about ⅜ in. in diameter.

*Example IV.*—The pellets obtained in the foregoing example are charged into a vertical cylindrical reaction chamber 3 in. diameter inside and 5 feet high, electrically heated. Cracked unrefined gasoline is pumped into the bottom of the reaction chamber and is maintained at the pressure of 250 lbs. per square inch and at a temperature from 250° to 300° C. The treated gasoline is then removed at the top of the chamber and redistilled to the desirable end point, representing completely refined product.

*Example V.*—Benzene is pumped through this catalytic mass and ethylene is forced through it at the pressure of 450 lbs. per square inch in countercurrent to benzene at the temperature of 250° C. The issuing liquid is fractionated to separate ethyl benzene from unreacted benzene. Ethylization is 60% complete.

*Example VI.*—Ethylene at initial pressure of 700 lbs. per square inch is heated in an autoclave for 8 hours at 340° C. with my catalyst. About 20% of ethylene is polymerized to a gasoline product.

I claim as my invention:—

1. A catalyst comprising the product of a mixture of a substance taken from the group consisting of a mineral phosphate, phosphatic slag, Thomas slag, and superphosphate, with a substance taken from the group consisting of sulfuric acid and sludge acid, with an adsorbent silicious substance, the free sulfuric acid being largely expelled by calcination at a temperature below red heat.

2. A catalyst comprising the product of a mixture of a substance taken from the group consisting of a mineral phosphate, phosphatic slag, Thomas slag, and superphosphate, with a substance taken from the group consisting of sulfuric acid and sludge acid, with an adsorbent silicious substance, the mixture being calcined at a temperature sufficient to cause the substance of the first group to be decomposed by the substance of the second group and the free sulfuric acid to be largely expelled, but below red heat.

3. A catalyst comprising the product of a mixture of a substance taken from the group consisting of a mineral phosphate, phosphatic slag, Thomas slag, and superphosphate, in presence of a substance characterized by its ability to hydrolyze in water to yield sulfuric acid and with an adsorbent silicious substance, the mixture being calcined at a temperature sufficient to decompose the substance of the first group by the substance of the second group, and to largely expel the free sulfuric acid, but below red heat.

4. A step in the process of preparation of a catalyst, consisting in mixing together a substance taken from the group consisting of a mineral phosphate, phosphatic slag, Thomas slag, and superphosphate, with a substance characterized by its ability to hydrolyze in water to yield sulfuric acid, and with an adsorbent silicious substance, and calcining the mixture at a temperature sufficient to decompose the first substance by the second substance, and to largely expel acid fumes of the substance having acidic sulfuric acid reaction but below red heat, the quantity of the second substance being sufficient for decomposition of the first substance.

5. A step in the process of preparation of a catalyst, consisting in mixing together a substance taken from the group consisting of a mineral phosphate, phosphatic slag, Thomas slag, and superphosphate, with a substance taken from the group consisting of sulfuric acid, sulfuric acid anhydride, and sludge acid, and with an adsorbent silicious substance, and calcining the mixture at a temperature sufficient to largely expel the free sulfuric acid but below red heat.

6. A method of preparation of a catalyst, comprising the step of calcining a substance taken from the group consisting of phosphate rock, apatite, vivianite, monazite, Thomas slag, phosphatic slag, and superphosphate, with an adsorbent silicious substance in presence of a substance characterized by its ability to hydrolize in water to yield sulfuric acid, the calcination being conducted at a temperature sufficient for substantially expelling the acid fumes of the substance having acidic sulfuric acid reaction but below red heat, the quantity of the latter substance being sufficient for decomposing the phosphatic substance.

7. A method of preparation of a catalyst, comprising the steps of preparing an intimate powdered mixture of a substance taken from the group consisting of phosphate rock, apatite, vivianite, monazite, Thomas slag, phosphatic slag, and superphosphate, with an adsorbent silicious substance, and with sludge acid disintegrating the mixture with steam, calcining the mixture in presence of an oxidizing agent at a temperature sufficient for substantially expelling sludge acid fumes but below red heat, the quantity of the latter substance being sufficient for decomposing the phosphatic substance and treating the product with steam.

BORIS MALISHEV.